United States Patent
Weston et al.

(10) Patent No.: US 12,233,876 B2
(45) Date of Patent: Feb. 25, 2025

(54) LOCATION-BASED VEHICLE OPERATION

(71) Applicant: Ford Global Technologies, LLC, Dearborn, MI (US)

(72) Inventors: Keith Weston, Canton, MI (US); Brendan F. Diamond, Grosse Pointe, MI (US); Kenneth James Boyd, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 17/211,933

(22) Filed: Mar. 25, 2021

(65) Prior Publication Data

US 2022/0306119 A1    Sep. 29, 2022

(51) Int. Cl.
| | |
|---|---|
| *B60W 40/02* | (2006.01) |
| *B60Q 1/20* | (2006.01) |
| *B60W 10/30* | (2006.01) |
| *B60W 30/12* | (2020.01) |

(52) U.S. Cl.
CPC .............. *B60W 40/02* (2013.01); *B60Q 1/20* (2013.01); *B60W 10/30* (2013.01); *B60W 30/12* (2013.01); *B60W 2510/18* (2013.01); *B60W 2510/20* (2013.01); *B60W 2556/50* (2020.02)

(58) Field of Classification Search
CPC ......... B60Q 1/20; B60W 40/02; B60W 10/30; B60W 30/12; B60W 2510/18; B60W 2510/20; B60W 2556/50
See application file for complete search history.

(56) References Cited

U.S. PATENT DOCUMENTS

| | | | |
|---|---|---|---|
| 6,356,837 B1 | 3/2002 | Yokota et al. | |
| 7,003,397 B2 | 2/2006 | Yokota et al. | |
| 7,407,028 B2 | 8/2008 | Tanaka | |
| 8,275,542 B2 | 9/2012 | Adachi et al. | |
| 8,284,995 B2 | 10/2012 | Diaz et al. | |
| 8,983,717 B2 | 3/2015 | Pupin et al. | |
| 9,174,538 B2 | 11/2015 | Zawade et al. | |
| 9,720,412 B1* | 8/2017 | Zhu .................... | G05D 1/0246 |
| 9,751,534 B2* | 9/2017 | Fung .................... | G06V 10/764 |
| 10,013,617 B2 | 7/2018 | Zhao et al. | |
| 10,099,372 B2 | 10/2018 | Vu et al. | |
| 10,836,382 B2 | 11/2020 | Schneider et al. | |
| 11,321,950 B2* | 5/2022 | Lee ........................ | G08G 1/16 |
| 11,597,407 B2* | 3/2023 | Kim ..................... | B60W 10/20 |

(Continued)

FOREIGN PATENT DOCUMENTS

| | | |
|---|---|---|
| DE | 102005051910 A1 | 9/2006 |
| DE | 102013209242 A1 | 11/2014 |
| WO | 2020047065 A1 | 3/2020 |

OTHER PUBLICATIONS

Non-Final Office Action dated Mar. 28, 2022; U.S. Appl. No. 16/883,413, filed May 26, 2020.

*Primary Examiner* — Thomas E Worden
*Assistant Examiner* — Christopher Scott
(74) *Attorney, Agent, or Firm* — Frank A. MacKenzie; Brooks Kushman P.C.

(57) ABSTRACT

Upon determining that a vehicle is operating at an off-road location, a control parameter for the vehicle can be adjusted to compensate for data from a vehicle sensor affected by operating at the off-road location. The vehicle can then be operated at the off-road location according to the adjusted control parameter.

20 Claims, 3 Drawing Sheets

(56) References Cited

U.S. PATENT DOCUMENTS

| | | | |
|---|---|---|---|
| 11,619,944 B2* | 4/2023 | Grossman | B60W 60/0023 701/23 |
| 2003/0200016 A1* | 10/2003 | Spillane | B60K 28/16 701/36 |
| 2007/0021912 A1* | 1/2007 | Morita | G01C 21/3602 701/431 |
| 2007/0032913 A1* | 2/2007 | Ghoneim | B60W 40/10 701/1 |
| 2016/0221581 A1* | 8/2016 | Talwar | G01N 29/14 |
| 2017/0205246 A1 | 7/2017 | Koenig et al. | |
| 2018/0001895 A1 | 1/2018 | Fairgrieve et al. | |
| 2018/0023963 A1* | 1/2018 | Foltin | G01C 21/3415 701/442 |
| 2018/0281797 A1* | 10/2018 | Berels | B60K 17/344 |
| 2018/0290590 A1* | 10/2018 | Goldman-Shenhar | B60Q 9/008 |
| 2018/0319402 A1 | 11/2018 | Mills et al. | |
| 2018/0356798 A1 | 12/2018 | Ciovnicu et al. | |
| 2019/0077406 A1 | 3/2019 | Dudar et al. | |
| 2020/0206928 A1 | 7/2020 | Denenberg et al. | |
| 2020/0272123 A1 | 8/2020 | Denenberg et al. | |
| 2020/0393835 A1* | 12/2020 | Gregg | G01C 21/343 |
| 2021/0163021 A1* | 6/2021 | Frazzoli | H04W 4/48 |
| 2021/0362705 A1* | 11/2021 | Singh | E02F 9/261 |

\* cited by examiner

LOCATION-BASED VEHICLE OPERATION

BACKGROUND

Modern vehicles can include systems or features to assist a human user with various vehicle operations. Such systems, sometimes referred to as Advanced Driver Assistance Systems (ADAS), can include features such as adaptive cruise control, emergency braking, blind spot monitoring, lane keeping assistance, etc. Various vehicle sensors may be provided to support ADAS and other features, such as cameras, lidars, radars, ultrasonic sensors, etc.

DESCRIPTION

Figure 1:
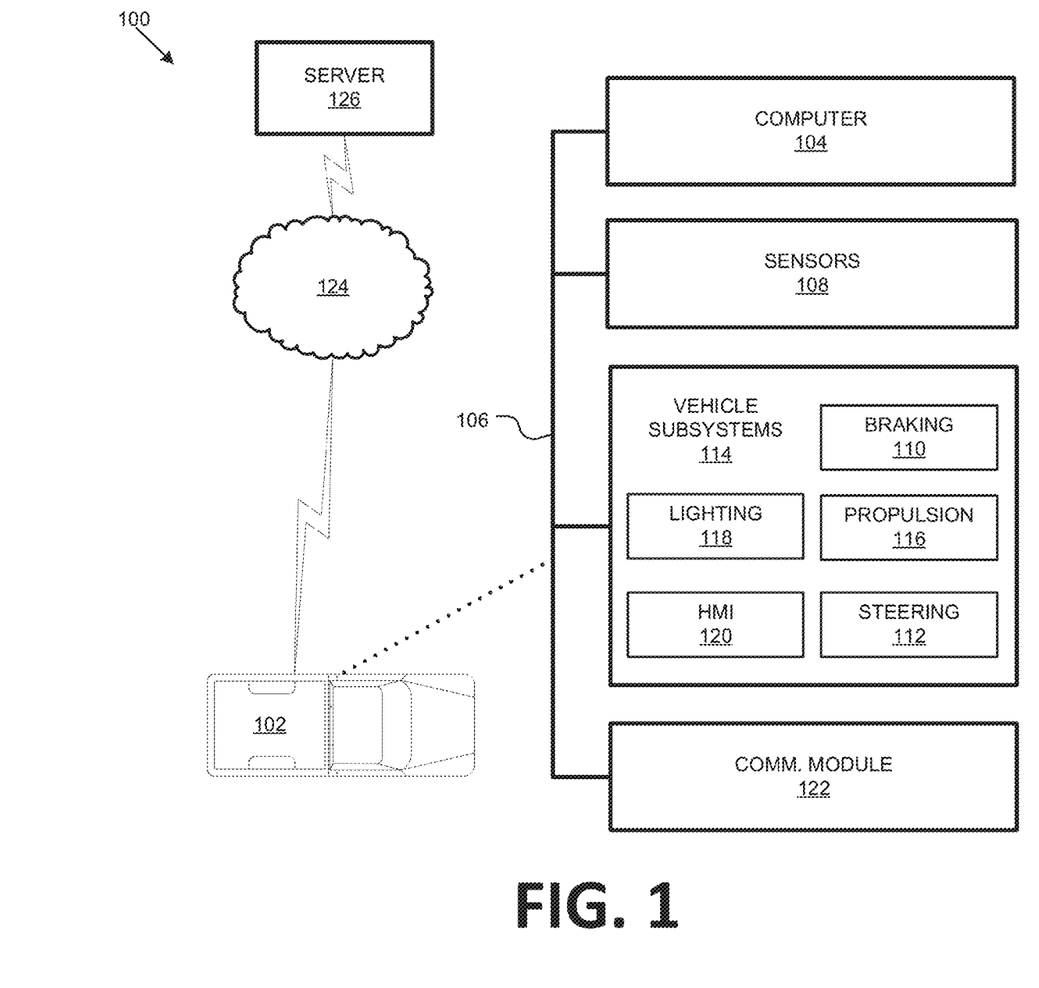
FIG. 1 is a block diagram of a location-based vehicle operation system.
Figure 2:
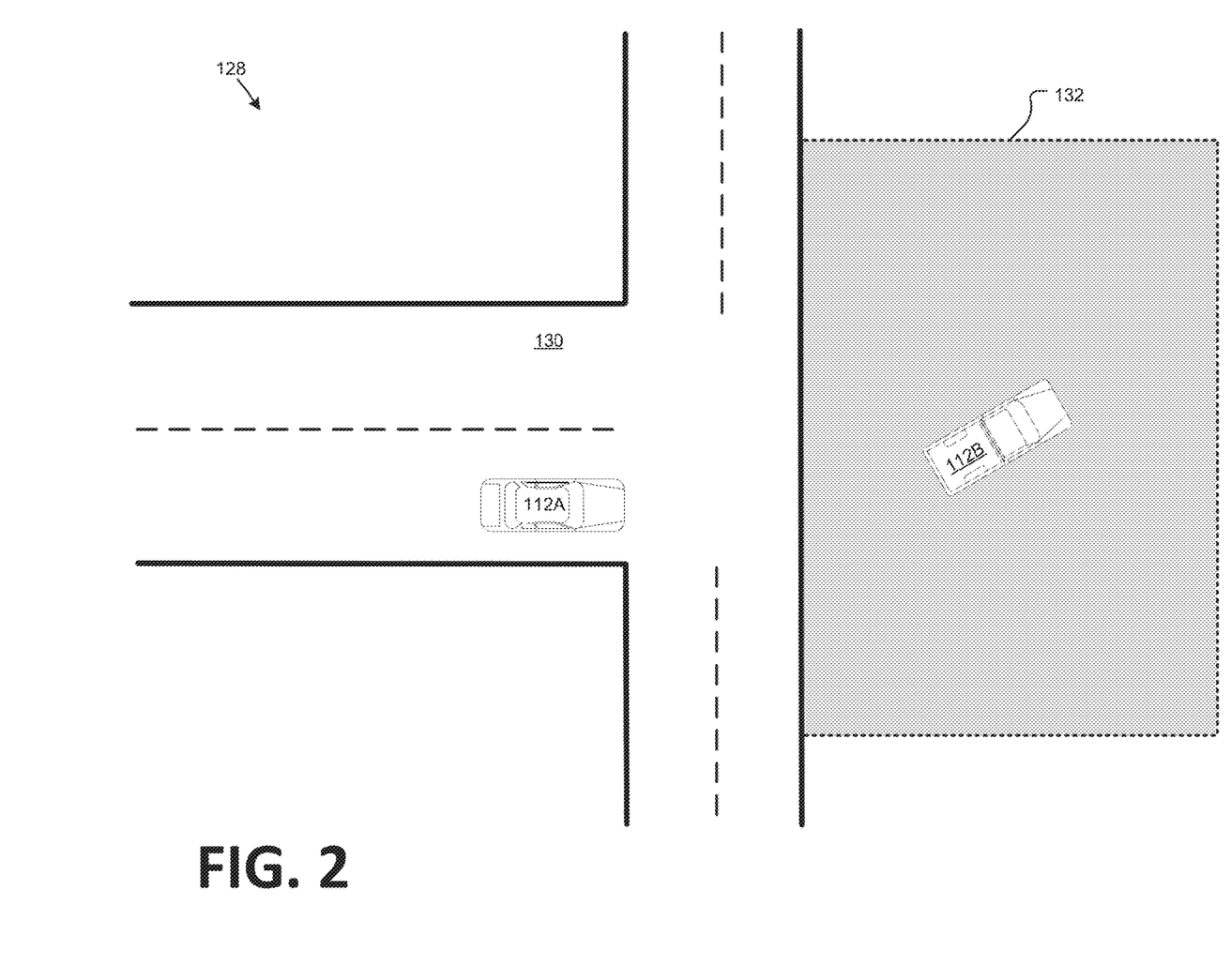
FIG. 2 is a top view of a vehicle travel region.

Referring to FIGS. 1 and 2, a location-based vehicle operation system 100 can be provided for controlling various vehicle 102 features based on a location of the vehicle 102. For example, some vehicles 102 may operate both on paved, public roads, as well as on various an off-road locations 132. A vehicle 102 may include a computer 104 in communication with various sensors 108 and vehicle subsystems 114 via a vehicle communication network 106. The sensors 108 can provide data for operation of subsystems. However, various sensors 108 and/or vehicle subsystems 114 may operate differently depending on a vehicle 102 operating environment, e.g., whether the vehicle 102 is operating on a road 130 or at an off-road location 132. Further, data values from a sensor 108 can have different meanings, interpretations, and/or weights depending on a vehicle location, e.g., depending on a type of surface on which a vehicle 102 is operating.

Accordingly, the vehicle computer 104 can determine, e.g., by comparing a vehicle 102 location to stored map data, by receiving user input, according to sensor 108 data, and/or by receiving information from a remote server 126 via a wide area network 124, a classification of a surface on which a vehicle 102 is operating, e.g., whether a vehicle 102 is operating on a road 130 or an off-road location 132, including a determination of various types of operating surfaces including various types of off-road surfaces. Upon determining that the vehicle 102 is operating an off-road location 132, the computer 104 can adjust operation of one or more vehicle subsystems 114 to improve vehicle 102 operation on the off-road surface 130. For example, the vehicle subsystems 114 can include one or more of a braking subsystem 110, propulsion subsystem 116, a steering subsystem 112, a lighting subsystem 118, and/or a vehicle 102 HMI (human-machine interface) 120.

The vehicle operation system 100 includes at least one vehicle 102, e.g., as shown in FIG. 1, but further can include a wide area network 124 to provide communication between the vehicle 102 and a remote server 126. Further, the vehicle operation system 100 could include multiple vehicles 102 (although not shown in the figures), which could be selectively in communication with each other and/or the remote server 126. The vehicle 102 typically includes a computer 104, one or more sensors 108, one or more vehicle subsystems 114, as mentioned above, as well as a communication module 122.

A system as described herein comprises a computer including a processor and a memory, the memory storing instructions executable by the processor to determine that a vehicle is operating at an off-road location; adjust a control parameter for the vehicle to compensate for data from a vehicle sensor affected by operating at the off-road location; and operate the vehicle at the off-road location according to the adjusted control parameter.

The control parameter can be a threshold for evaluating the data from the vehicle sensor; and the instructions to adjust the control parameter can include instructions to adjust the threshold.

The control parameter can be a braking subsystem input value, a steering subsystem input value, or a propulsion subsystem input value.

The vehicle sensor can be one of a plurality of vehicle sensors, and the control parameter can be one of a plurality of control parameters; and the instructions can further include instructions to adjust respective ones of the plurality of control parameters to compensate for data from respective ones of the vehicle sensors.

The control parameter can be a light input value used to determine an amount of light detected to activate vehicle high-beams.

The control parameter can govern output of a braking subsystem, a steering subsystem, or a propulsion subsystem.

The control parameter can govern output of a vehicle lighting system for a vehicle human-machine-interface.

The control parameter can be a lane-keeping parameter and the vehicle sensor can be a camera; and the instructions to adjust the control parameter for the vehicle to compensate for the data from the vehicle sensor can include instructions to adjust a pattern recognition algorithm.

The control parameter can be an output parameter for a vehicle interface; and the instructions to adjust the control parameter for the vehicle to compensate for the data from the vehicle sensor can include instructions to adjust the output parameter to adjust at least one of an intensity of output and a frequency of output.

The instructions to determine that the vehicle can be operating at the off-road location can further include instructions to compare a vehicle location to stored map data specifying the off-road location to determine that the vehicle location can be the off-road location. The instructions to determine that the vehicle can be operating at the off-road location further can include instructions to receive user input to determine that the location can be the off-road location. The off-road location can be a car wash, a parking lot, a race track, or an unpaved area.

The instructions to adjust the control parameter can include instructions to deactivate a vehicle system that uses data from the vehicle sensor.

A method as described herein can comprise determining that a vehicle can be operating at an off-road location; adjusting a control parameter for the vehicle to compensate for data from a vehicle sensor affected by operating at the off-road location; and operating the vehicle at the off-road location according to the adjusted control parameter.

The control parameter can be a threshold for evaluating the data from the vehicle sensor; and adjusting the control parameter can include adjusting the threshold.

The control parameter can be a braking subsystem input value, a steering subsystem input value, or a propulsion subsystem input value.

The vehicle sensor can be one of a plurality of vehicle sensors, and the control parameter can be one of a plurality of control parameters;

The method can further comprise adjusting respective ones of the plurality of control parameters to compensate for data from respective ones of the vehicle sensors The parameter can be a light input value used to determine an amount of light detected to activate vehicle high-beams.

The control parameter can govern output of a braking subsystem, a steering subsystem, or a propulsion subsystem.

The control parameter can be a lane-keeping parameter and the vehicle sensor can be a camera; and adjusting the control parameter for the vehicle to compensate for the data from the vehicle sensor can include adjusting a pattern recognition algorithm.

A vehicle 102 may be any suitable type of ground vehicle 102, e.g., a passenger or commercial automobile such as a sedan, a coupe, a truck, a sport utility, a crossover, a van, a minivan, a taxi, a bus, etc.

The vehicle computer 104 includes a processor and a memory, and is arranged for communication on a vehicle network 106. The memory includes one or more forms of computer 104 readable media, and stores instructions executable by the vehicle computer 104 for performing various operations, including as disclosed herein. Additionally, it is to be understood that the vehicle computer 104 referred to herein typically represents a plurality of computing devices typically provided in a vehicle 102; processing disclosed herein as carried out by the computer 104 for ease of description may be distributed among a plurality of devices as discussed further below, and the vehicle network 106 may be used for communications between devices represented as the computer 104 in this disclosure (e.g., electronic control units in the vehicle 102). Further, as mentioned below, various devices and/or sensors 108 may provide data to a computer 104 via the vehicle communication network 106.

For example, the computer 104 can be a generic computer 104 with a processor and memory as described above and/or may include an electronic control unit (ECU) or controller for a specific function or set of functions, and/or a dedicated electronic circuit including an ASIC that is manufactured for a particular operation, e.g., an ASIC for processing sensor 108 data and/or communicating the sensor 108 data. In another example, computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory of a computer 104 can be of any suitable type, e.g., hard disk drives, solid state drives, servers, or any volatile or non-volatile media. The memory can store the collected data sent from the sensors 108. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104.

The computer 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 106 such as a communications bus as described further below, more than one processor, e.g., included in components such as sensors 108, electronic controller units (ECUs) or the like included in the vehicle 102 for monitoring and/or controlling various vehicle 102 components, e.g., a powertrain controller included in a propulsion subsystem 116, a brake controller included in a braking subsystem 110, a steering controller included in a steering subsystem 112, etc.

Vehicles 102 typically include a variety of sensors 108. A sensor 108 is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system (GPS) sensors 108; accelerometers such as piezo-electric or microelectromechanical systems (MEMS); gyroscopes such as rate, ring laser, or fiber-optic gyroscopes; inertial measurements units (IMU); and magnetometers. Some sensors 108 detect the external world, for example, radar sensors 108, scanning laser range finders, light detection and ranging (LIDAR) devices, and image processing sensors 108 such as cameras. A LIDAR device detects distances to objects by emitting laser pulses and measuring the time of flight for the pulse to travel to the object and back. Some sensors 108 are communications devices, for example, vehicle 102-to-infrastructure (V2I) or vehicle 102-to-vehicle 102 (V2V) devices. sensor 108 operation can be affected by obstructions, e.g., dust, snow, insects, etc. Often, but not necessarily, a sensor 108 includes a digital-to-analog converter to converted sensed analog data to a digital signal that can be provided to a digital computer 104, e.g., via a network. sensors 108 can include a variety of devices, and can be disposed to sense and environment, provide data about a machine, etc., in a variety of ways. For example, various controllers in a vehicle 102 may operate as sensors 108 to provide data via the vehicle network 106 or bus, e.g., data relating to vehicle 102 speed, acceleration, location, subsystem and/or component status, etc. Further, other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor 108 data could include data for determining a position of a component, a location of an object, a speed of an object, a type of an object, a slope of a roadway, a temperature, a presence or amount of moisture, a fuel level, a data rate, etc.

A vehicle 102 includes a plurality of vehicle subsystems 114. A vehicle subsystem 114 is a set of components or parts, including hardware components and typically also software and/or programming, to perform a function or set of operations in the vehicle 102. vehicle subsystems 114 typically include a braking subsystem 110, a propulsion subsystem 116, a steering subsystem 112, a lighting subsystem 118, and a user interaction or interface subsystem such as an HMI 120.

The braking subsystem 110 can resist the motion of the vehicle 102 to thereby slow and/or stop the vehicle 102. The braking system may include friction brakes such as disc brakes, drum brakes, band brakes, and so on; regenerative brakes; any other suitable type of brakes; or a combination. The braking subsystem 110 is in communication with and receives input from the computer 104 and/or a human operator. A human operator may control the braking system via, e.g., a brake pedal.

The propulsion subsystem 116 converts energy to rotation of vehicle 102 wheels to propel the vehicle 102 forward and/or backward. The propulsion subsystem 116 may include one or more of an internal combustion engine, electric motor, hybrid engine, etc. The propulsion subsystem 116 is in communication with and receives input from the computer 104 and/or a human operator. A human operator may control the propulsion subsystem 116 via, e.g., an accelerator pedal.

The steering subsystem 112 can control a yaw, e.g., turning left and right, maintaining a straight path, of the vehicle 102 as it moves. The steering subsystem 112 controls the turning of vehicle 102 wheels. The steering subsystem 112 is in communication with and receives input from a steering wheel and/or the computer 104. The steering subsystem 112 may include a rack-and-pinion system with electric power-assisted steering, a steer-by-wire system, e.g., such as are known, or any other suitable system.

The lighting subsystem 118 can control operation of vehicle 102 lights, e.g., headlamps, tail lamps, etc. providing on the exterior of the vehicle 102. The lighting subsystem 118 can include one or more sensors 108 to detect ambient light around the vehicle 102 and/or light from sources around the vehicle 102, such as headlamps or lights from other vehicles 102. The lighting subsystem 118 is in communication with and receives input from a steering wheel and/or the computer 104 to control vehicle 102 lights, e.g., to activate and/or deactivate vehicle 102 high beams based on light detected from a surrounding environment.

The vehicle 102 can include an HMI 120 (human-machine interface), e.g., one or more of a display, a touchscreen display, a microphone, a speaker, etc. The user can provide input to devices such as the computer 104 via the HMI 120. The HMI 120 can communicate with the computer 104 via the vehicle network 106, e.g., the HMI 120 can send a message including the user input provided via a touchscreen, microphone, a camera that captures a gesture, etc., to a computer 104, and/or can display output, e.g., via a screen, speaker, etc.

The computer 104 may be configured for communicating via a communication module 122 or interface with devices outside of the vehicle 102, such as a remote server 126. For example, the communication module 122 can be configured for one or more of vehicle 102 to vehicle 102 (V2V), vehicle 102-to-infrastructure or everything (V2X) or vehicle 102-to-everything including cellular communications (C-V2X) wireless communications (cellular, DSRC., etc.) to another vehicle 102, to an infrastructure element (typically via direct radio frequency communications) and/or (typically via the network) a remote server 126. The module could include one or more mechanisms by which the computers 104 of vehicles 102 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module can include cellular, Bluetooth, IEEE 802.11, dedicated short range communications (DSRC), cellular V2X (CV2X), and the like.

In one example, the communication module 122 allows the vehicle computer 104 to communicate with one or more remote sites such as the remote server 126, via a wide area network 124. The wide area network 124 can include one or more mechanisms by which a vehicle computer 104 may communicate with, for example, a remote server 126. Accordingly, the network can include one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks such as mentioned above, (e.g., using Bluetooth®, Bluetooth® Low Energy (BLE), IEEE 802.11, vehicle 102-to-vehicle 102 (V2V) or vehicle 102 to everything (V2X) such as cellular V2X (CV2X), Dedicated Short Range Communications (DSRC), etc.), local area networks (LAN) and/or wide area networks (WAN), including the Internet, providing data communication services.

The remote server 126 is typically a computing device including a processor and a memory and/or peripheral or additional memory or data storage, and may be configured for any suitable communication mechanism to communicate via the wide area network 124.

Now also referring to FIG. 2 in addition to FIG. 1, the computer 104 can determine that a vehicle 102 is operating at an on-road 130 or an off-road location 132. For example, a vehicle 102A is shown on a road 130, and a vehicle 102B is shown at an off-road location 132. A road 130 herein, unless specified otherwise, means a prepared travel surface publicly designated for vehicle 102 travel, e.g., graded dirt, asphalt, gravel, etc. Further, a road 130 typically includes markings, e.g., paint, embedded markers, etc. to guide vehicle 102 travel, e.g., in one or more lanes. A road 130 can include more than one lane for vehicle 102 travel; each lane can be designated for travel in a specified direction. In some examples, a first road 130 can cross or merge with a second road 130, thereby forming an intersection. An off-road location herein means a location including a travel surface that is not prepared and/or publicly designated for vehicle 102 travel. An off-road location 132 could be a car wash, a parking lot, a race track, or an unpaved area, i.e., an area or location lacking, and/or including different, characteristics than found on or proximate to a road 130 that can affect or facilitate vehicle 102 operation.

The vehicle computer 104 can include programming to determine whether the vehicle 102 is operating on a road 130 or at an off-road location 132 in various ways. For example, the computer 104 can include programming to determine that the vehicle 102 is operating at the off-road location 132 by comparing a vehicle 102 location to stored map data specifying the off-road location 132 to determine that the vehicle 102 location is the off-road location 132. The computer 104 can store map data and/or can retrieve map data, in real time via the wide area network 124 and/or in advance of a planned visit to an off road 130 location, for example. A vehicle 102 could include a global positioning system (GPS) sensor 108 to provide data, e.g., geo-coordinates or the like, by which the computer 104 can compare a location of the vehicle 102 to a location specified on a map, e.g., according to geo-coordinates that define what is known as a geo-fence or the like, as including a road 130 or as being in an off-road location 132. Alternatively or additionally, the computer 104 could include program instructions to determine that the vehicle 102 is operating at the off-road location 132 by receiving user input to determine that the location is the off-road location 132. For example, a vehicle 102 user could provide input via the HMI 120 specifying to activate an off-road mode and/or that the vehicle 102 is operating at and off-road location 132, and/or to confirm that the vehicle is operating at an off-road location 132 after the off-road location 132 was detected according to GPS and map data, for example.

Upon determining that the vehicle 102 is operating at an off-road location 132, the computer 104 can then adjust one or more control parameters for the vehicle 102 to compensate for data from a vehicle sensor 108 sensor 108 affected by operating at the off-road location 132, and can then operate the vehicle 102 at the off-road location 132 according to the adjusted control parameter. A "control parameter" in the context of this document means a numeric value representing a physical measurement of, and/or specifying a physical measurement for, vehicle 102 operation, i.e., control parameter is a value measuring a physical quantity. A control parameter thus could be a threshold value used by the computer 104 to specify a vehicle 102 operation, and/or could be a value output to specify a vehicle 102 operation. That is, the present document discusses two examples of control parameters, input control parameters and output control parameters. Control parameters are typically stored in a computer 104 memory, but could additionally or alternatively be retrieved from a device outside a vehicle 102, e.g., a remote server 126 via a wide area network 124.

A input control parameter, which can also be referred to as a sensor 108 data input control parameter, is a value that the computer 104 can use to evaluate vehicle sensor 108 data. That is, a input control parameter is a value provided for comparison by the computer 104 to a current or recent value or values detected by a vehicle sensor 108. For example, the input control parameter can be a threshold to which a sensor 108 data value can be compared. Based on detecting a value or values, and comparing the detected value or values to a input control parameter, the computer 104 can determine whether and/or how to actuate a vehicle subsystem 114. Adjusting a input control parameter thus represents adjusting a control parameter to compensate or adjust for vehicle sensor 108 data provided in an off-road location 132. To provide just a few examples, a vehicle 102 may experience increased bumpiness or vibration in an off-road location 132, ambient light conditions may be different, objects expected to be detected by vehicle sensors 108 when the vehicle 102 is traveling on a road 130, e.g., road 130 signs, lane markings, etc., may be missing, etc., affecting data from a variety of vehicle sensors 108. Examples of input control parameters are provided in the table below, along with examples of output control parameters that may be adjusted based on use of the input control parameter. Each input control parameter typically relates to data provided on the vehicle network 106 by a conventional sensor 108, e.g., a speed input control parameter relates to evaluating data from a conventional speed sensor 108, steering wheel torque and steering wheel angle thresholds relate to evaluating data from conventional steering wheel torque and angle sensors 108, etc., just to name a few examples.

An output control parameter is a value that a computer 104 provides for vehicle 102 operation, i.e., a target or commanded value. For example, an output control parameter can be a steering angle change (i.e., to change an angle of vehicle 102 wheels with respect to a longitudinal axis of the vehicle 102), a target vehicle 102 speed or acceleration, output to an HMI 120, etc., just to name a few examples. Further examples are provided in the table below, along with a input control parameter that in some cases may also be adjusted, but in other cases may not be adjusted, along with an adjustment to the output control parameter.

A vehicle computer 104 can select control parameters for vehicle 102 operation according to a vehicle 102 location. That is, control parameters can be determined for respective vehicle 102 location classifications, i.e., examples of control parameters in the below table could further be provided for respective location classifications. A location classification classifies, i.e., specifies or describes, a type of surface on which the vehicle 102 is traveling or will travel at a specified location. Location classifications can be "on road" or "off-road," for example. However, typically, even more granular classifications are desirable. For example, location classifications could include one or more of "on road," "off-road—carwash," "off-road—parking lot," "off-road—racetrack, paved," "off-road—racetrack, dirt," "off-road—dirt trail," "off-road—sand dune," "off-road—rock crawling," etc. Moreover, control parameters, i.e., values for control parameters, could be determined for respective location classifications. In general, control parameters can be determined by empirical testing, i.e., by operating a vehicle 102 in a test environment intended to simulate a location classification and expected conditions therein, e.g., a surface at an off-road location 132, expected lighting conditions, etc.

It is to be understood that Table 1 is provided for purposes of illustration and not limitation; other control parameters and/or combinations of control parameters are possible and indeed likely to be implemented.

TABLE 1

| Sensor data input control parameter | Output control parameter(s) | Off-Road Adjustment Example(s) |
|---|---|---|
| Vehicle speed (i.e., distance over time) | Automatic braking activation | Adjust speed threshold for automatically activating brakes, e.g., for "rock crawling" environment automatic braking activation could be disabled below a specified speed threshold. |
| Vehicle speed | Time-to-collision (TTC) parameter | May be reduced for some off-road environments. |
| Vehicle speed | Distance to follow lead vehicle in adaptive cruise control | Reduce distance for off-road environment |

TABLE 1-continued

| Sensor data input control parameter | Output control parameter(s) | Off-Road Adjustment Example(s) |
|---|---|---|
| Vehicle acceleration (i.e., first derivative of speed) | Engine torque to achieve target acceleration | Increase time to achieve target acceleration, by reducing throttle/propulsion response e.g., target engine torque, for off-road environment. |
| Vehicle acceleration | Target acceleration | Increase time to achieve target acceleration, by reducing rate of change to torque applied to vehicle wheels for off-road environment. |
| Detected brake pedal force (amount of force on a brake pedal; analogous parameter would be brake pedal position) | Activating or deactivating a brake control subsystem; determining an amount of braking (i.e., amount or rate of deceleration, amount of force with which to apply brake pads to rotors, etc.) | Reduce time for pre-charging brake system to apply automatic braking; increase braking distance; decrease amount of force applied to brake rotors based on brake pedal force. |
| Steering wheel angle (angle that a steering wheel is turned from a default or defined "neutral" position) | Target vehicle yaw rate | Ignore input (e.g., for car-wash environment; provide damping to input to change vehicle steering angle for off-road trails or outdoor surfaces to compensate for likely larger user inputs. |
| Steering wheel torque | Amount of torque applied to a vehicle steering wheel | Ignore input (e.g., for car-wash environment; provide damping to input to change vehicle steering angle for off-road trails or outdoor surfaces to compensate for likely larger user inputs, i.e., to avoid overcontrolling. |
| Light intensity (e.g., in lumens) as measured by data from an optical sensor, e.g., a camera | Activation/deactivation of high-intensity vehicle headlamps (high beams) | Deactivate high beams (e.g., car wash or parking structure environment) and/or reduce a threshold for activating high beams to account for increased reflection from dust and/or debris, e.g., on a dirt trail. |
| Lane marking detected in camera image | Lane departure output (haptic output to vehicle steering wheel); steering control to automatically recenter vehicle in lane | Deactivate; modify pattern-recognition algorithm for lane keeping system to recognize trail edges or other hazards of off-road surface; reduce frequency and/or increase intensity of lane departure warnings, e.g., haptic outputs to vibrate vehicle wheels, vehicle steering wheel, etc. |
| Detected location classification triggers enhanced camera | Activate 360° camera | Activate 360° camera viewing for environments such as carwashes, rock crawling, etc. |
| Detected location classification triggers adjustment to one or more driving assist features. | Activate or adjust driving assist feature. | Activate or adjust electronic stability control, an antilock braking system, and/or traction control. |
| Detected location classification and detected environmental condition triggers adjustment to sensor weight | Weight given to data from various sensors in data fusion process (e.g., respective weights to camera data and radar data combined for object detection). | Adjust weight given to affected sensor in data fusion process (e.g., bad light, dust, and/or fog reduces weight given to camera data and increases weight given to radar |

As will be apparent from the above, including Table 1, where the control parameter is a threshold for evaluating data from a vehicle sensor 108, and the computer 104 includes instructions to adjust the control parameter, the instructions thus include instructions to adjust the threshold. As also explained above, the threshold could be, for example, a braking subsystem 110 threshold, a steering subsystem 112 threshold, a propulsion subsystem 116, or a lighting subsystem 118 threshold and/or the control parameter governs output of a braking subsystem 110, a steering system 112, or a propulsion system 116.

Further, the computer 104 could adjust a control parameter for one and only one vehicle sensor 108, but more often the computer 104 will adjust control parameters for a plurality of vehicle sensors 108, i.e., an adjusted input control parameter will be is one of a plurality of thresholds. That is, the computer 104 will include instructions to adjust respective ones of the plurality of thresholds to compensate for data from respective ones of the vehicle sensors 108. For example, the computer 104 could adjust a speed threshold and a steering wheel torque threshold to control a steering subsystem 112, e.g., an amount of damping applied to user input to change a vehicle 102 steering angle, for example. Alternatively or additionally, to compensate or adjust for data from a plurality of vehicle sensors 108, an adjusted control parameter could be one or more output control parameters. For example, in certain off-road environments adjusted output control parameters could include control parameters for a plurality or even all of the subsystems 110, 112, 116, 118, 120 discussed herein.

Figure 3:
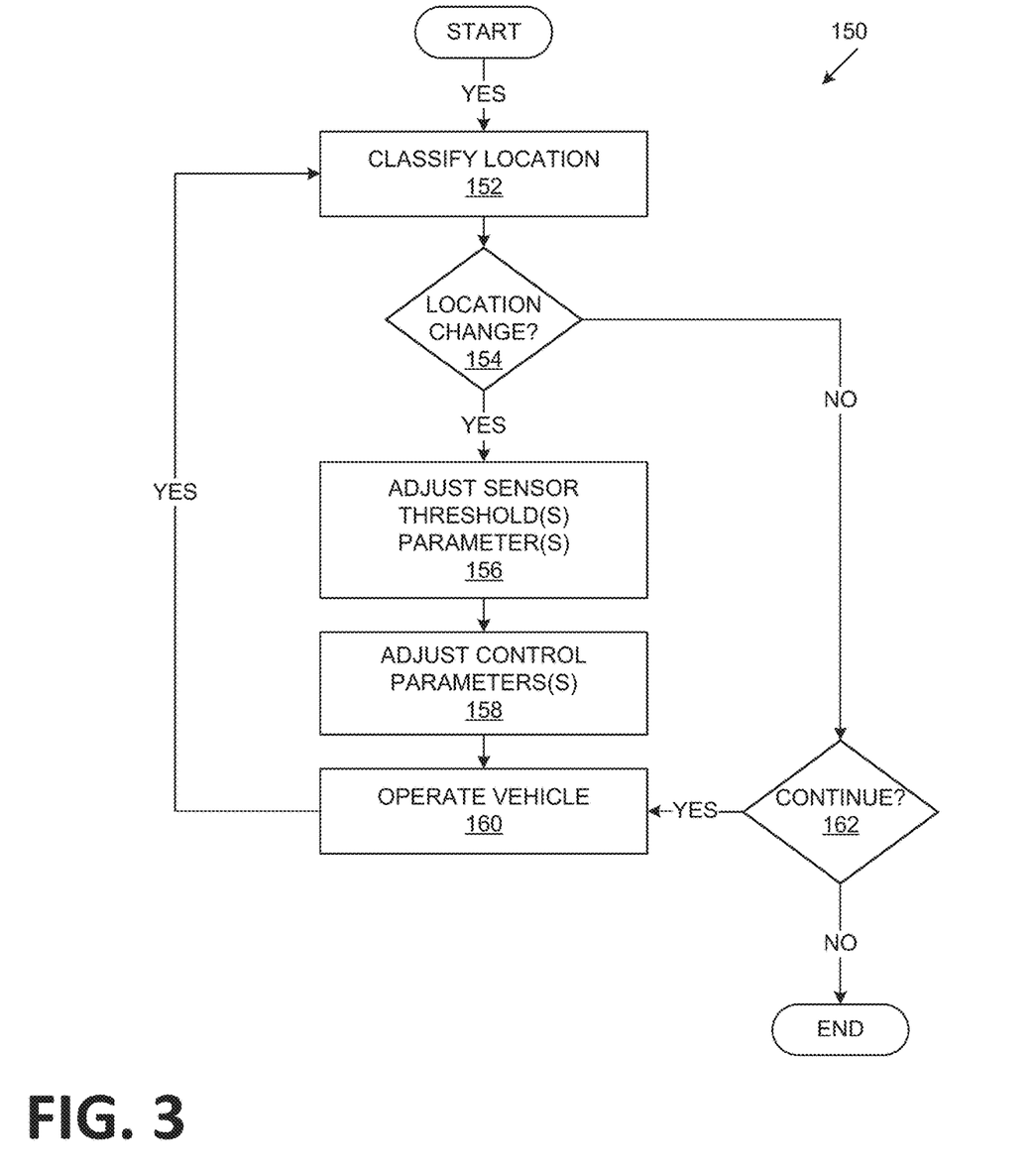
FIG. 3 is a process flow diagram of an example process that can be carried out in the vehicle operation system.

FIG. 3 is a process flow diagram of an example process 150 that can be carried out in the vehicle operation system 100.

The process 150 begins in a decision block 152, in which the vehicle computer 104 classifies a vehicle 102 location, e.g., according to a one of a plurality of possible classifications or categories as explained above. As further explained above, a vehicle 102 location could be classified based on user input to a vehicle 102 HMI 120, or alternatively or additionally by comparing a vehicle 102 location to map data specifying a classification of the vehicle 102 location.

Next, in a block 154, the vehicle computer 104 determines whether a classification of the vehicle 102 location has changed. For example, the vehicle computer 104 could be programmed to determine a vehicle 102 location is a default location, e.g., a road 130 location, when a vehicle 102 including the computer 104 is powered on, and to check the location classification and change the location classification if warranted. Alternatively or additionally, a location classification could be changed while a vehicle 102 is operating, i.e., while a vehicle 102 changes locations and moves from a location with a first classification to a location with a second classification. Yet further additionally or alternatively, a location classification could be changed according to user input. Yet further additionally or alternatively, a location classification could be changed based on determining a vehicle paths move from a location with a first classification to a location of the second classification, e.g., according to map and GPS data as described above, but only upon requesting and receiving user confirmation of the application change, e.g., via the HMI 120 and/or based on stored user preferences. If the vehicle 102 location classification has changed, then the process 150 proceeds to a block 156. Otherwise, the process 150 proceeds to a block 162.

In the block 156, the vehicle computer 104 retrieves sensor 108 input control parameters such as described above, and implements sensor 108 input control parameters specified for adjustment based on the determined location classification.

In the block 158, the vehicle computer 104 retrieves output control parameters such as described above, and implements output control parameters specified for adjustment based on the determined location classification.

Then, in a block 160, the computer 104 operates the vehicle 102 according to the parameters adjusted in the block 156 and/or the block 158. Following the block 160, the process 150 returns to the block 152.

In the decision block 162, which may follow the block 160, the computer 104 determines whether the process 150 should continue. For example, user input could be received to disable or deactivate the process 150, the computer 104 could detect that the vehicle 102 is being deactivated or power down, etc. If the process 150 is not to continue, then the process 150 ends following the block 162. Otherwise, the process 150 returns to the block 160.

Executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, any other physical medium with patterns of holes, a RAM, a PROM, an EPROM, a FLASH EEPROM, any other memory chip or cartridge, or any other medium from which a computer can read.

Use of "in response to," "based on," and "upon determining" herein indicates a causal relationship, not merely a temporal relationship.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

That is, the disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. A system, comprising a computer including a processor and a memory, the memory storing instructions executable by the processor to:
   determine that a vehicle is operating at an off-road location by comparing a sensed vehicle location to stored map data specifying the off-road location to determine that the vehicle location is the off-road location;
   determine a location classification of the off-road location based on map data for the off-road location;
   identify vehicle sensors affected by operating the vehicle at the off-road location;
   identify vehicle control parameters governed by data collected from respective ones of the vehicle sensors affected by operating the vehicle at the off-road location;
   determine vehicle control parameters for the location classification of the off-road location;
   adjust the vehicle control parameters to compensate for the data collected from the respective vehicle sensors affected by operating at the off-road location;
   adjust the vehicle control parameters based on the determined location classification of the off-road location; and
   operate the vehicle at the off-road location according to the adjusted control parameters.

2. The system of claim 1, wherein:
   the control parameters are thresholds for evaluating the data from the respective vehicle sensors; and
   the instructions to adjust the control parameters include instructions to adjust the thresholds.

3. The system of claim 1, wherein the control parameters include a braking subsystem input value, a steering subsystem input value, or a propulsion subsystem input value.

4. The system of claim 1, wherein:
   the control parameters include a light input value used to determine an amount of light detected to activate vehicle high-beams.

5. The system of claim 1, wherein at least one of the control parameters governs output of a braking subsystem, a steering subsystem, or a propulsion subsystem.

6. The system of claim 1, wherein at least one of the control parameters governs output of a vehicle lighting system for a vehicle human-machine-interface.

7. The system of claim 1, wherein:
   the control parameters include a lane-keeping parameter and the vehicle sensor is a camera; and
   the instructions to adjust the control parameters for the vehicle to compensate for the data from the vehicle sensor include instructions to adjust a pattern recognition algorithm.

8. The system of claim 1, wherein:
   the control parameters include an output parameter for a vehicle interface; and
   the instructions to adjust the control parameter for the vehicle to compensate for the data from the vehicle sensor include instructions to adjust the output parameter to adjust at least one of an intensity of output and a frequency of output.

9. The system of claim 1, wherein the instructions to determine that the vehicle is operating at the off-road location further include instructions to receive user input to determine that the location is the off-road location.

10. The system of claim 1, wherein the off-road location is a car wash, a parking lot, a race track, or an unpaved area.

11. The system of claim 1, wherein the instructions to adjust at least one of the control parameters include instructions to deactivate a vehicle system that uses data from the respective vehicle sensor.

12. A method, comprising:
   determining that a vehicle is operating at an off-road location by comparing a sensed vehicle location to stored map data specifying the off-road location to determine that the vehicle location is the off-road location;
   determining a location classification of the off-road location based on map data for the off-road location;
   identifying vehicle sensors affected by operating the vehicle at the off-road location;
   identifying vehicle control parameters governed by data collected from respective ones of the vehicle sensors affected by operating the vehicle at the off-road location;
   determining vehicle control parameters for the location classification of the off-road location;
   adjusting the vehicle control parameters to compensate for the data collected from the respective vehicle sensors affected by operating at the off-road location;
   adjusting the vehicle control parameters based on the determined location classification of the off-road location; and
   operating the vehicle at the off-road location according to the adjusted control parameters.

13. The method of claim 12, wherein:
   the control parameters are thresholds for evaluating the data from the respective vehicle sensors; and
   adjusting the control parameters include instructions to adjust the thresholds.

14. The method of claim 12, wherein the control parameters include a braking subsystem input value, a steering subsystem input value, or a propulsion subsystem input value.

15. The method of claim 12, the control parameters include a light input value used to determine an amount of light detected to activate vehicle high-beams.

16. The method of claim 12, wherein at least one of the control parameters governs output of a braking subsystem, a steering subsystem, or a propulsion subsystem.

17. The method of claim 12, wherein:
   the control parameters include a lane-keeping parameter and the vehicle sensor is a camera; and
   adjusting the control parameter for the vehicle to compensate for the data from the vehicle sensor includes adjusting a pattern recognition algorithm.

18. A system, comprising a computer including a processor and a memory, the memory storing instructions executable by the processor to:
   determine that a vehicle is operating at an off-road location;
   adjust a lane-keeping parameter for the vehicle to compensate for data from a vehicle sensor affected by operating at the off-road location including adjusting a pattern recognition algorithm of a lane-keeping system to compensate for the off-road location by recognizing hazards of the off-road location; and
   operate the vehicle at the off-road location according to the adjusted control parameter.

19. The system of claim 18, wherein the vehicle sensor is one of a plurality of sensors and the lane-keeping parameter is one of a plurality of control parameters, and the instructions further include instructions to:

identify ones of the sensors affected by operating the vehicle at the off-road location;

identify respective vehicle control parameters governed by data from respective ones of the sensors;

adjust the control parameters to compensate for the data from the respective vehicle sensors affected by operating at the off-road location.

20. The system of claim 18, wherein:

the control parameters are thresholds for evaluating the data from the respective vehicle sensors; and the instructions to adjust the control parameters include instructions to adjust the thresholds.

\* \* \* \* \*